Nov. 30, 1965 C. A. HARMAN 3,221,087
PREPARING HEAT SENSITIVE MATERIALS IN IMPROVED PHYSICAL FORM
Filed March 19, 1962
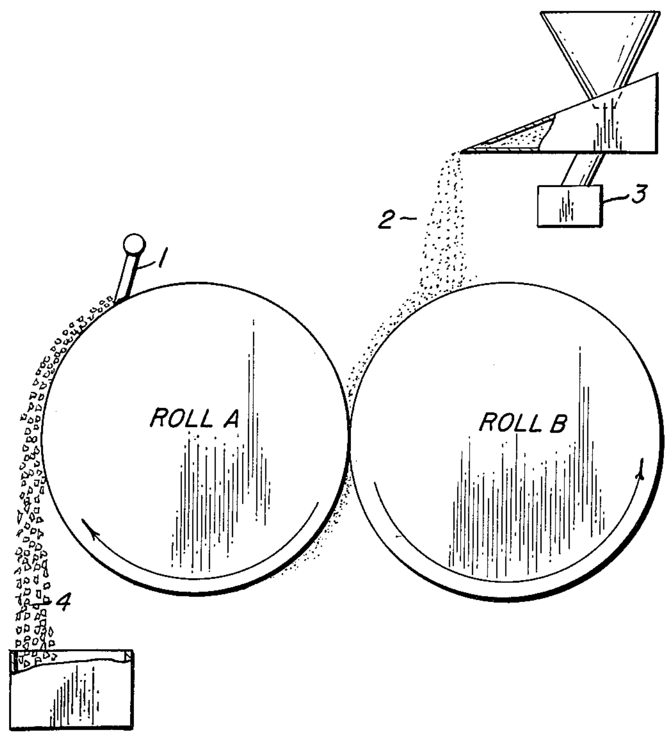
INVENTOR
CARL A. HARMAN
BY Richard O. Zerbe
AGENT United States Patent Office 3,221,087

Patented Nov. 30, 1965

3,221,087

PREPARING HEAT SENSITIVE MATERIALS IN IMPROVED PHYSICAL FORM

Carl A. Harman, St. Albans, W. Va., assignor to Monsanto Company, a corporation of Delaware Filed Mar. 19, 1962, Ser. No. 180,810
9 Claims. (Cl. 264—144)

The present invention relates to the method of preparing solid heat sensitive materials in improved physical form. By solid heat sensitive materials is meant normally solid materials which gradually deteriorate in molten condition. Materials which decompose suddenly and violently would be hazardous and are excluded.

In general, solid thiazolesulfenamides used for accelerating vulcanization of rubber deteriorate in molten condition. Attempts extending over several years were made to develop a melt flaking technique to upgrade the product form of such heat sensitive materials since the operation is economical and flaked form has such desirable properties as reduced dustiness, reduced tendency to cake in storage, improved conveyability and ease of dispersion providing the flakes are sufficiently thin to disintegrate readily in rubber mixing equipment. Previous efforts to melt flake such materials were unsuccessful not only because of instability of materials at melt temperature but because they tended to supercool.

There has now been discovered a process of preparing flaked solids from normally solid materials that gradually deteriorate at melting temperature which comprises in combination the steps of forming molten film from said solid and immediately converting the molten film to solid film by subjecting it to an environment below its crystallizing temperature but high enough to avoid supercooling and recovering solid product. For example, dry heat sensitive powder can be fed to a surface heated above the melting point of the powder to form molten film and the molten film immediately transferred to a cooled surface within the temperature range indicated and solid product recovered. Alternatively, the said molten product can be immediately prilled in a gaseous or liquid cooling medium.

The invention not only provides an improved product form having the advantages enumerated above but also, in the case of sulfenamide accelerators, improves the quality and produces a more stable product. Furthermore, special equipment with which to carry out the process is unnecessary. The required combination of steps can be carried out on conventional equipment as hereinafter demonstrated.

A typical heat sensitive material to which the process is applicable is the accelerator N-cyclohexyl-2-benzothiazolesulfenamide. In order to determine whether this product could be held molten for a sufficiently long period of time to permit use of conventional melt flaking technique, samples were held at or slightly above melting temperature for different periods of time. The product soon deteriorated and assumed a gummy semi-plastic form which did not crystallize. A convenient method of following the deterioration is to determine the portion of a sample insoluble in ether. The accelerator readily dissolves in ether but products from heat deterioration are insoluble. The following ether insoluble contents were observed after heating a typical commercial sample at a temperature of 100–105° C.

| Heat time in hours: | Ether insoluble content |
|---|---|
| 0 | 0.47 |
| ½ | 0.99 |
| 1 | 1.12 |
| 1½ | 1.14 |

The maximum time at which the material could be held molten before flaking characteristics seriously deteriorated was approximately one-half hour. Thereafter the rate of crystallization decreased rapidly. From these results it is apparent that conventional melt flaking techniques would be inapplicable.

By feeding the powdered product to a heated surface and transferring immediately to the cooling surface or other cooling medium, the interval during which the material is at melt temperature is reduced to a minimum. By immediately transferring to a cooling medium is meant that the interval between melting and cooling is short enough to avoid substantial product decomposition and deterioration of the flaking characteristics. The maximum interval permitted will vary depending upon the particular material involved. In the preferred operation, according to this invention, the interval will be on the order of only a few seconds.

Apparatus for carrying out the improved process can vary widely and forms no part of the invention. It is not a novel feature. On the contrary, preferred operation adapts a conventional flaker fitted with applicator roll. One form of flaker embodies a cooling or flaking roll dipping into a pan of molten material. Desirability of keeping to a minimum the amount of heat sensitive material in molten form at one time has been recognized before and flakers with applicator rolls have been developed and recommended for such materials. Use of applicator rolls can be beneficial in applying a film of molten material to the cooled surface when the molten material will not adhere to a dipped cooled surface. Molten material is fed to the applicator roll which may be enclosed to minimize oxidation. While this permits reducing amount of material which must be kept in molten form at one time, it fails to prevent decomposition of the more heat sensitive materials besides necessitating a separate melting operation before feeding to the flaker. In this connection, it will be apparent that practice of this invention is particularly advantageous with heat sensitive materials prepared and isolated in solid form.

The applicator roll is usually smaller than the cooling roll. For carrying out the process of this invention an applicator roll can be conveniently adapted for melting the solid material to be flaked. Of course, two rolls of equal size could also be adapted for carrying out the process as for example, two 24″ rolls revolving inwardly at 2–4 r.p.m. However, the heating surface required is normally considerably less than that of the cooling surface so that maximum efficiency is achieved by a small melting roll and a relatively large cooling roll. For example, a 16″ diameter applicator roll in conjunction with a 48″ flaking roll provides an efficient combination for large scale production. The melting cycle is preferably less than 15 seconds. The melting roll will usually be heated at temperatures within the range of 107–132° C. When flaking N-cyclohexyl-2-benzothiazolesulfenamide or N-tert-butyl-2-benzothiazolesulfenamide. The heating is conveniently accomplished by feeding steam at 2 to 25 pounds pressure per square inch to the heating roll. The preferred range for the aforesaid sulfenamide is 5-20 pounds steam. Too low steam temperature results in sticking to the hot roll and incomplete transfer to the cooled roll. The flaking roll for the aforesaid materials will normally be within the range of 40–65° C. Optimum temperature falls within the range of 43–60° C. and will vary depending upon the size of the rolls. With small 6″ x 8″ rolls optimum temperature was about 60° C. but lower with larger equipment. The powdered product is fed evenly over the descending quadrant of the hot rotating roll turning inwardly when viewed from above. The actual roll surface will normally be from 5 to 10° below the temperature of the steam used for heating. The powder may be fed by a vibratory spreader feeder, screw conveyor or vibrating screen. It is advisable to avoid feeding large lumps of material. Traces of the powder may be allowed to fall on the cooling drum as a seeding measure but experience showed that this was normally unnecessary. Shielding the powder from the cooling drum made no difference in the operation.

The distance between the melting roll and the flaking roll can vary but is ordinarily less than 1/32 in. The proper spacing is important for attaining complete transfer of molten material from the hot to the cool surface but will vary depending upon the viscosity of the molten material. Suitable adjustment of the spacing eliminates need for an auxiliary transfer device. The range of 1/64 to 1/128 in. provides good results. Wider than 1/32 in. is permissible but may permit the hot melt to drip from the melting roll. Smaller spacing than 1/128 in. is permissible but the reduction in rate of production may then become objectionable. The point at which product is removed from the flaking roll can vary but the freshly formed solid film is somewhat soft and pliable and if attempt is made to remove product too soon it may come off as a sheet. By providing sufficient cooling surface the film becomes brittle enough that upon removal of product it divides into small flakes or granules of convenient size. The melting roll may be placed directly above the flaking roll or at any other convenient point and material removed by a stationary knife from the cooling roll after less than one revolution. The cooling roll will usually rotate in the range of 1–9 r.p.m. A conventional double drum flaker or dryer, with minor alterations, is a satisfactory machine to utilize for this purpose.

FIGURE 1 is a drawing illustrative of a double-drum dryer or flaker for carrying out the process of this invention. Roll A of FIGURE 1 is a cooling roll and roll B is a heating roll. Roll A and roll B rotate inwardly when viewed from above. The powdered product 2 is fed evenly over the upper descending quadrant of the heating roll. The powder is fed from a vibrating spreader 3. The powdered product 2 melts and transfers cleanly to the surface of the cooling roll A where the rolls are adjacent. The molten material crystallizes on the cooling roll and is cut off by a knife device 1 as small flakes 4.

The chief impurity present in benzothiazolesulfenamide accelerators is 2,2′-dithiobis(benzothiazole). This disulfide is insoluble in ether and commercial samples of the accelerator even when freshly prepared contain organic constituents insoluble in ether. Discovery of the present process and that it reduces ether insoluble content suggests that it actually converts disulfide to sulfenamide. Improved quality and stability are especially noticeable when processing solid product prepared in aqueous medium.

As a specific embodiment of the invention powdered N-cyclohexyl-2-benzothiazolesulfenamide was spread evenly across the upper descending quadrant of one roll of a 6″ x 8″ double drum dryer, rotating inwardly when viewed from above at 2 r.p.m. and heated with steam at 5 pounds per square inch gauge pressure. The second roll, also turning inwardly at 2 r.p.m., and cooled with water at 60° C. flowing within the roll, was spaced 1/64 in. from the heated roll, and was fitted with a conventional knife device mounted at the upper outer quadrant of the roll to remove the cooled solid from its surface. Thirteen pounds of powdered material was fed to the heated roll per hour by means of a vibratory feeder. It melted and transferred cleanly to the surface of the cooled drum at the point where the rolls were most adjacent. The molten material crystallized on the rotating cooled roll and was cut off cleanly by the knife as small flakes (approximately 1/64 in. thick x 1/4 in. x 1/8 in. in dimension). Very little fines (<5% of —40 mesh) were contained in the flaked material. The powdered N-cyclohexyl-2-benzothiazolesulfenamide contained 0.93% ether insolubles. The flaked product contained 0.56% ether insolubles. Samples of these materials were stored in closed glass bottles in an oven maintained at 40° C. After 19 days the powder contained 3.68% ether insolubles, and had caked strongly. The flakes remained free flowing and contained 2.26% ether insolubles. After 27 days at 40° C. the caked powder contained 4.29% ether insolubles, and the flakes 3.28% ether insolubles. The flakes had remained free-flowing.

Following are further results typical of the upgrading observed when the process was carried out with different grades of sulfenamide or with different sulfenamides.

| INSOLUBLE CONTENT OF N-CYCLOHEXYL-2-BENZOTHIAZOLESULFENAMIDE | |
|---|---|
| Powder fed to flaker | Flakes |
| 1.62 | 1.26 |
| 1.81 | 1.29 |
| 0.95 | 0.60 |
| 0.59 | 0.53 |
| 0.95 | 0.78 |
| 0.32 | 0.32 |
| 0.98 | 0.86 |
| **INSOLUBLE CONTENT OF 2 YEAR OLD SAMPLE OF 2-(2,6-DIMETHYLMORPHOLINYLMERCAPTO)BENZOTHIAZOLE** | |
| Powder fed to flaker | Flakes |
| 1.03 | 0.56 |
| **INSOLUBLE CONTENT OF MORPHOLINYLMERCAPTOBENZOTHIAZOLE** | |
| Powder fed to flaker | Flakes |
| 4.73 | 4.21 |

The improvement is even more dramatic after storage of the powdered and flaked products. Comparisons of ether insoluble content were made after storing both product forms at 40–45° C. for varying periods of time. In the table below the accelerators are identified as follows:

| Code: | Accelerator |
|---|---|
| C | N-cyclohexyl-2-benzothiazolesulfenamide. |
| T | N-tert-butyl-2-benzothiazolesulfenamide. |
| DM | 2-(2,6-dimethylmorpholinylmercapto)benzothiazole. |

| Accelerator | Sample Number | Physical form | Insoluble content (percent) after storage at 40–45° C. for— | | | | | |
|---|---|---|---|---|---|---|---|---|
| | | | 14 days | 18 days | 20 days | 26 days | 28 days | 36 days |
| C | 5-029 | Powder | ------ | 2.44 | ------ | 2.92 | ------ | ------ |
| | | Flakes | ------ | 1.54 | ------ | 2.36 | ------ | ------ |
| C | 10-049 | Powder | ------ | ------ | 3.68 | ------ | 4.29 | ------ |
| | | Flakes | ------ | ------ | 2.26 | ------ | 3.28 | ------ |
| T | 11-009 | Powder | ------ | 0.46 | ------ | 0.67 | ------ | 1.07 |
| | | Flakes | ------ | 0.09 | ------ | 0.27 | ------ | 0.86 |
| DM | 19-574 | Powder | 1.51 | ------ | ------ | ------ | ------ | ------ |
| | | Flakes | 1.32 | ------ | ------ | ------ | ------ | ------ |

Other materials to which the process is applicable include:

2-benzothiazolesulfenamine
N-isopropyl-2-benzothiazolesulfenamide
N-benzyl-2-benzothiazolesulfenamide
N-furfuryl-2-benzothiazolesulfenamide
N-tetrahydrofurfuryl-2-benzothiazolesulfenamide N-(2-hydroxyethyl)-2-benzothiazolesulfenamide
N,N'-ethylenebis-2-benzothiazolesulfenamide
2-morpholinylmercaptobenzothiazole
2-piperidinylmercaptobenzothiazole
1,4-bis(2-benzothiazolylmercapto)piperazine
N,N'-diisopropyl-2-benzothiazolesulfenamide
N,N'-dithiobis(morpholine)
2-(1-hexamethylenimine)thiobenzothiazole The process is also applicable to solid acid polymerized 2,2,4-trimethyldihydroquinoline. This material does not transfer satisfactorily from the melting to the cooling roll but this can be overcome by blending the powdered polymer with stearic acid in amount of about 5% before feeding to the melting roll. It is apparent that many different materials may be processed according to this invention. To compile a comprehensive catalogue of heat sensitive materials and conditions for melting and flaking them would be impossible. To formulate a set of specifications for heat sensitive materials in light of the present disclosure will call for chemical and engineering knowledge but those skilled in the art can deduce with confidence applicably to the purposes of the invention. Routine tests not of an inventive nature will provide reliable data. It is assumed that no one will wish to obtain a useless result or will be misled because it is possible to misapply the teachings of the present disclosure in order to do so.

It is intended to cover all changes and modifications of the examples of the invention herein chosen for purposes of disclosure which do not constitute departures from the spirit and scope of the invention.

What is claimed is:

1. The process of preparing normally solid materials that gradually deteriorate at melting temperature, in improved physical form, which comprises in combination forming molten film from said solid by feeding the solid to a heated surface above its melting point and immediately converting the molten film to solid film by subjecting it to an environment at a temperature below its crystallizing temperature but high enough to avoid supercooling and recovering solid product.

2. The process of preparing heat sensitive materials in improved physical form which comprises in combination forming molten film by feeding and spreading dry powdered normally solid thiazolesulfenamide accelerator on a heated surface above the melting point of the accelerator, converting to solid film by immediately transferring to a surface below the crystallizing temperature of the accelerator but high enough to avoid supercooling and recovering solid product in the form of flakes.

3. The process of claim 2 in which the thiazolesulfenamide accelerator has been prepared in aqueous medium.

4. The process of producing flaked solids which comprises in combination forming a molten film by feeding and spreading dry powdered N-cyclohexyl-2-benzothiazolesulfenamide on a heated surface above its melting point, forming solid film by immediately transferring the molten solid film to a surface at a temperature below the crystallizing temperature of N-cyclohexyl-2-benzothiazolesulfenamide but high enough to avoid supercooling and removing solid N-cyclohexyl-2-benzothiazolesulfenamide from the surface in the form of flakes.

5. The process of producing flaked solid which comprises in combination forming a molten film by feeding and spreading powdered N-cyclohexyl-2-benzothiazolesulfenamide below its melting point on a heated rotating surface above its melting point, immediately cooling and converting to solid film by transferring the molten solid film to a second rotating surface which is below the crystallizing temperature of the molten solid film but high enough to avoid supercooling and removing solid N-cyclohexyl-2-benzothiazolesulfenamide from the surface in the form of flakes.

6. The process of producing flaked solid which comprises in combination forming a molten film by feeding and spreading powdered N-tert-butyl-2-benzothiazolesulfenamide below its melting point on a heated rotating surface above its melting point, immediately cooling and converting to solid film by transferring the molten solid film to a second rotating surface which is below the crystallizing temperature of the molten solid film but high enough to avoid supercooling and removing solid N-tert-butyl-2-benzothiazolesulfenamide from the surface in the form of flakes.

7. The process of producing flaked solid which comprises in combination forming a molten film by feeding and spreading powdered 2-morpholinylmercaptobenzothiazole below its melting point on a heated rotating surface above its melting point, immediately cooling and converting to solid film by transferring the molten solid film to a second rotating surface which is below the crystallizing temperature of the molten solid film but high enough to avoid supercooling and removing solid 2-morpholinylmercaptobenzothiazole from the surface in the form of flakes.

8. The process of producing flaked solid which comprises in combination forming a molten film by feeding and spreading powdered 2-(2,6-dimethylmorpholinylmercapto)benzothiazole below its melting point on a heated rotating surface above its melting point, immediately cooling and converting to solid film by transferring the molten solid film to a second rotating surface which is below the crystallizing temperature of the molten solid film but high enough to avoid supercooling and removing solid 2-(2,6-dimethylmorpholinylmercapto)benzothiazole from the surface in the form of flakes.

9. The process of producing flaked solid which comprises in combination forming a molten film by feeding and spreading powdered 2-(1-hexamethylenimine)thiobenzothiazole below its melting point on a heated rotating surface above its melting point, immediately cooling and converting to solid film by transferring the molten solid film to a second rotating surface which is below the crystallizing temperature of the molten solid film but high enough to avoid supercooling and removing solid 2-(1-hexamethylenimine)thiobenzothiazole from the surface in the form of flakes.

References Cited by the Examiner

UNITED STATES PATENTS

| | | | |
|---|---|---|---|
| 2,297,505 | 9/1942 | Schmidberger. | |
| 3,023,253 | 2/1962 | Bain et al. | 18—47.5 XR |
| 3,055,909 | 9/1962 | Kinstler | 260—306.61 |

ROBERT F. WHITE, *Primary Examiner.*

MORRIS LIEBMAN, *Examiner.*